United States Patent
Kim et al.

(10) Patent No.: US 10,942,864 B2
(45) Date of Patent: Mar. 9, 2021

(54) SHARED MEMORY FOR DISTRIBUTED DATA

(71) Applicant: HEWLETT PACKARD ENTERPRISE DEVELOPMENT LP, Houston, TX (US)

(72) Inventors: Mijung Kim, Sunnyvale, CA (US); Alexander Ulanov, Sunnyvale, CA (US); Jun Li, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 374 days.

(21) Appl. No.: 15/774,489

(22) PCT Filed: Nov. 20, 2015

(86) PCT No.: PCT/US2015/061977
§ 371 (c)(1),
(2) Date: May 8, 2018

(87) PCT Pub. No.: WO2017/087002
PCT Pub. Date: May 26, 2017

(65) Prior Publication Data
US 2020/0250105 A1    Aug. 6, 2020

(51) Int. Cl.
*G06F 12/10* (2016.01)
*G06F 12/1072* (2016.01)

(52) U.S. Cl.
CPC .... *G06F 12/1072* (2013.01); *G06F 2212/656* (2013.01)

(58) Field of Classification Search
None
See application file for complete search history.

(56) References Cited

U.S. PATENT DOCUMENTS

| | | | |
|---|---|---|---|
| 5,918,229 A * | 6/1999 | Davis | H04L 69/329 711/147 |
| 5,960,434 A * | 9/1999 | Schimmel | G06F 16/9014 |
| 8,417,789 B1 | 4/2013 | Gopalan et al. | |
| 8,832,674 B2 | 9/2014 | Harris et al. | |
| 9,021,050 B2 | 4/2015 | Shaver et al. | |
| 9,021,455 B2 | 4/2015 | Chapmna et al. | |
| 2005/0114350 A1* | 5/2005 | Rose | H04L 67/1097 |
| 2008/0270709 A1 | 10/2008 | Smits et al. | |
| 2011/0219204 A1 | 9/2011 | Caspole | |

(Continued)

OTHER PUBLICATIONS

Apache Ignite, "Key-Value In-Memory Data Grid", available online at <https://ignite.apache.org/features/datagrid.html>, 2015-2019, 10 pages.

(Continued)

*Primary Examiner* — Tracy C Chan
(74) *Attorney, Agent, or Firm* — Hewlett Packard Enterprise Patent Department

(57) ABSTRACT

Examples herein involve processing data in a distributed data processing system using an off-heap memory store. An example involves allocating a shared memory region of a shared memory to store attributes corresponding to a first partition of a distributed data system, and updating, in the shared memory region, the attributes corresponding to updates to the local data from process iterations of the first partition, such that a second partition of the distributed data system has access to the updated attributes.

11 Claims, 8 Drawing Sheets

(56) References Cited

U.S. PATENT DOCUMENTS

| | | |
|---|---|---|
| 2014/0026027 A1 | 1/2014 | Style |
| 2014/0156938 A1 | 6/2014 | Galchev et al. |
| 2014/0351549 A1 | 11/2014 | Harris et al. |
| 2016/0099810 A1* | 4/2016 | Li .................. G11C 15/00 713/193 |

OTHER PUBLICATIONS

"Off-Heap Memory", available online at <https://apacheignitereadme.io/v1.0/docs/off-heap-memory>, retrieved on Aug. 30, 2019, 5 pages.

Ignite, "Network Configuration", available online at <https://web.archive.org/web/20160414141302/https://apacheignite.readme.io/docs/network-config>, Apr. 14, 2016, 9 pages.

Ignite, "What is Ignite?", available online at <https://web.archive.org/web/20160414142159/https://apacheignite.readme.io/docs/what-is-ignite>, Apr. 14, 2016, 5 pages.

Gridgain, "GridGain In-Memory Computing Platform 6.0/Data Grid," retrieved online Apr. 11, 2015, http://atlassian.gridgain.com/wiki/display/GG60/Off-Heap+Memory.

International Search Report & Written Opinion received in PCT Application No. PCT/US2015/061977, dated Jul. 26, 2016, 10 pages.

M. Li, et.al., "Scaling Distributed Machine Learning With the Parameter Server," OSDI, Oct. 6-8, 2014, 17 pages.

Terracotta, Inc., "Configuring Off-Heap Store," retrieved online Apr. 11, 2015, https://terracotta.org/generated/4.3.1/html/bmg-all/index.html#page/bigmemory-go-webhelp/co-tiers_configuring_offheap_store.html.

Xin, R. et al., "Project Tungsten: Bringing Spark Close to Bare Metal," Apr. 28, 2015, https://databricks.com/blog/2015104/28/project-tungsten-bringing-spark-closer-to-bare-metal.html.

* cited by examiner

US 10,942,864 B2

SHARED MEMORY FOR DISTRIBUTED DATA

BACKGROUND

Distributed data systems store objects across a plurality of data partitions of the distributed data systems. Accordingly, data associated with the objects is distributed among the plurality of partitions. Local processors of the data partitions may locally process the data of the corresponding partitions. The local updated data may then be recombined at a later stage to provide an updated object.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve using an off-heap memory store of a distributed data processing system to store attributes of local data of partitions of the data processing system. The example off-heap memory store uses a shared memory fabric to enable the partitions to access the attributes of other partitions using direct memory access. In examples herein, attribute tables are created and updated in attribute partitions of the off-heap memory store that correspond to owner partitions of the distributed data system. The attribute tables enable fast access to attributes of the distributed data and create a cache mechanism that allows in-place updates to the attributes of the partition data after each process iteration.

Running large-scale iterative, memory intensive workloads via data processing engines in many previous technologies involves many inefficiencies. For example, resilient distributed datasets (RDD) are often immutable and used to store data updated in each iteration, thus involving multiple instances of cached RDDs and corresponding increase in memory consumption. Additionally, many systems involve non-deterministic garbage collection such that unreferenced RDDs continue to reside in heap memory until next garbage collection invocation, further increasing memory consumption. Furthermore, limited heap memory results in inefficient RDD cache eviction policy that causes eviction of RDD partitions that may need to be recomputed to return to a previous state in order to advance to a subsequent iteration. Examples herein provide a new data caching system implemented by an off-heap memory environment with a fast-interconnect (e.g., at least 56 Gb/sec), The example off-heap memory environment is a shared memory, such as a dynamic random access memory (DRAM) system and/or non-volatile memory (NVM) fabric.

An example method includes allocating a shared memory region to store attributes corresponding to a first partition of a distributed data system, the off-heap memory store comprising a attribute partition; processing local data in the partition in iterations; and updating the attributes after each iteration in the shared memory region, such that a second partition other than the first partition has access to the updated attributes.

Figure 1:
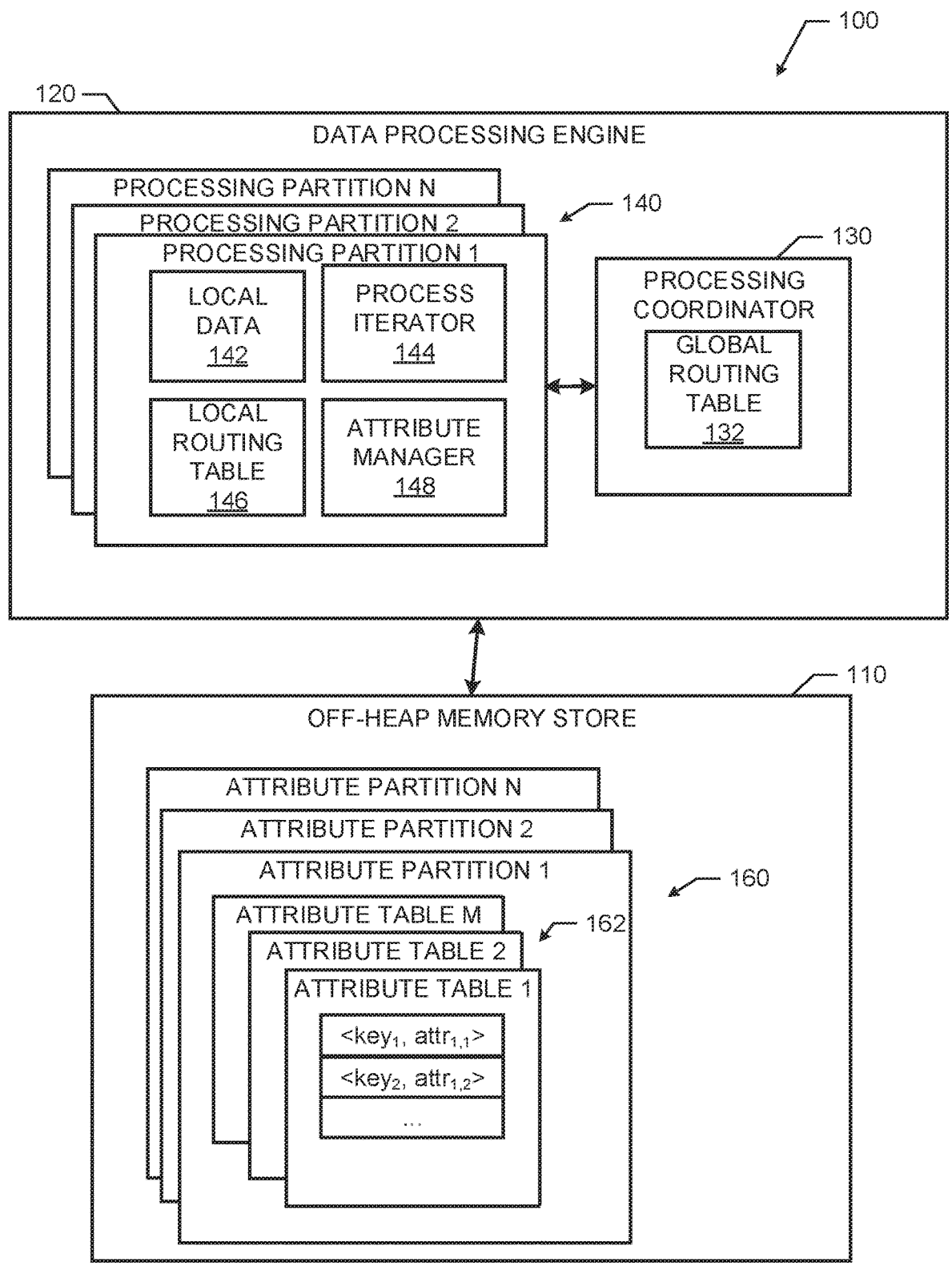
FIG. 1 is a schematic diagram of an example data processing system including an off-heap memory store implemented in accordance with examples herein.

FIG. 1 is a schematic diagram of an example data processing system 100 (e.g., a distributed data processing system) including an off-heap memory store 110 implemented in accordance with examples herein. The example data processing system 100 includes the off-heap memory store 110 in communication with a data processing engine 120. The example off-heap memory store 110 is implemented by a shared memory (e.g., a dynamic random access memory (DRAM), a non-volatile memory (NVM)) that is accessible by a plurality of processing nodes of the data processing engine 120. The example data processing engine 120 may be implemented by any heap processing engine (e.g. a data flow engine including a plurality of processing nodes). In examples herein, the data processing engine 120 may create (e.g., from a shared memory of the data processing system 100) and use the off-heap memory store 110 as a cache mechanism in accordance with examples herein. The data processing engine 120 may communicate with the off-heap memory store 110 via a high-speed interconnect that enables direct memory access to shared memory regions of the off-heap memory store.

The example data processing engine 120 of FIG. 1 may be a distributed data processing engine that includes a processing coordinator 130 and a plurality of processing partitions 140 (which may be collectively referred to herein as the processing partitions 140). The example processing partitions 140 (labelled Partition 1, Partition 2, . . . Partition N, where N is a number of processing partitions 140 of the data processing engine 120) of the data processing engine 120 include local data 142, a process iterator 144, a local routing table 146, and an attribute manager 148. The example local data 142 of the processing partitions 140 may store data (e.g., $<key_i/value_i>$ pairs) for a distributed data object (e.g., a graph). The process iterator 144 is a processing node (e.g., a virtual machine) of the data processing engine 120. A distributed data object in the processing partitions 140 may be associated with at least one attribute $\{attr_1, attr_2, \ldots, attr_n\}$. The example process iterator 144 may refer to the local routing table 146 for routing information of attributes for the processing partition 140. The example local routing table 146 may be implemented by a DRAM of the data processing system 100 of FIG. 1. The example attribute manager 148 of the processing partitions 140 manages attribute updates to attribute partitions 160 in the off-heap memory store 110 in accordance with examples herein. The attribute manager 148 may update routing information in the local routing tables 146 (e.g., after each processing iteration). In examples herein, the processing partitions 140 provide the local routing tables (e.g., or information from the local routing tables) to the processing coordinator 130, which then updates the global routing table 132 based on the information in the local routing tables 146. An example implementation of the attribute manager 148 is discussed in connection with FIG. 2.

In examples herein; the processing coordinator 130 of the data processing engine 120 may coordinate data processing (e.g., data shuffling, graph processing, etc.) of the partitions and use of the off-heap memory store 110. The processing coordinator 130 of FIG. 1 may serve as a master processor of the processing partitions 140 that manages partition attribute tables in a global routing table 132 that include location information of the attribute partitions within the off-heap memory 110 (see FIG. 5). In examples herein, the attribute manager 148 of the processing partitions 140 may refer to the global routing table 132 of the processing coordinator 130 to identify routing information for the attribute partitions 160 in the off-heap memory store 110 (e.g., to perform a read access on one of the attribute partitions 160). For example, the processing coordinator 130 may distribute the global routing table 132 and/or a pointer to the global routing table 132 to the process iterators 144 of the processing partitions 140 and the attribute manager 148 may then access the routing information of the global routing table 132.

The example off-heap memory store 110 of FIG. 1 includes attribute partitions 160 (labelled Attribute Partition 1, Attribute Partition 2, Attribute Partition N, where N is a number of attribute partitions 160 of the data processing engine 120) accessible in accordance with examples herein. In FIG. 1, each of the attribute partitions 160 corresponds to (e.g., is owned by, is controlled by, etc.) one of the processing partitions 140 (e.g. Attribute Partition 1 may be owned by the process iterator 144 of Partition 1, Attribute Partition 2 may be owned by the process iterator 144 of Partition 2, etc.). In an attribute partition 160, each attribute $attr_j$ may be allocated with an attribute table 162, which stores pairs of $<key_i, attr_{m,i}>$. Accordingly, the example off-heap memory store 110 is inherently a distributed partitioned in-memory key/value store that may store and cache attributes for iterative processing of the local data 142 of the processing partitions 140.

In examples herein, the process iterators 144 of the processing partitions 140, considered owners/controllers (i.e., have write access capabilities) of the corresponding attribute partitions 160, create and update attributes of the local data 142 in each iteration in the corresponding attribute partitions 160, Furthermore, any of the processing partitions 140 may read access the attribute partitions 160 in the off-heap memory store 110 as the off-heap memory store 110 is in a shared memory. Accordingly, the processing partitions 140 may read access attribute partitions that they do not own. Such read/write accesses may involve synchronization. Accordingly, to increase data processing speed, the processing partitions 140 may access (e.g., read and write) the attribute partitions 160 in bulk.

Furthermore, in examples herein, the processing partitions 140 of FIG. 1 may be located on a machine node that is attached to a same memory fabric as the off-heap memory store 110 (and thus the attribute partitions 160). Accordingly, a difference between memory regions storing the processing partitions 140 and the memory regions storing the attribute partitions 160 (i.e., the off-heap memory store 110), is the memory storing the processing partitions 140 is a non-shared memory while the memory storing the attribute partitions 160 is a shared memory.

In some examples, the data processing engine 120 may include an in-memory shuffle system that utilizes the off-heap memory store (e.g., in a shared memory) to shuffle data between the processing partitions 140 for a next stage of processing. In examples herein, for a given one of the processing partitions 140 may retrieves its partition attributes from the attribute tables 162 and rely on the in-memory shuffle system to redistribute the attributes to the other processing partitions 140, where the re-distributed attributes may be retrieved from the in-memory shuffle system output and used for local data processing in the other partitions. Thus, in such examples, the given processing partition 140 may be able to only use local read access for attribute tables and the other partitions 140 may not necessarily need to perform remote read of the attribute tables 162 owned by the given processing partition 140.

Figure 2:
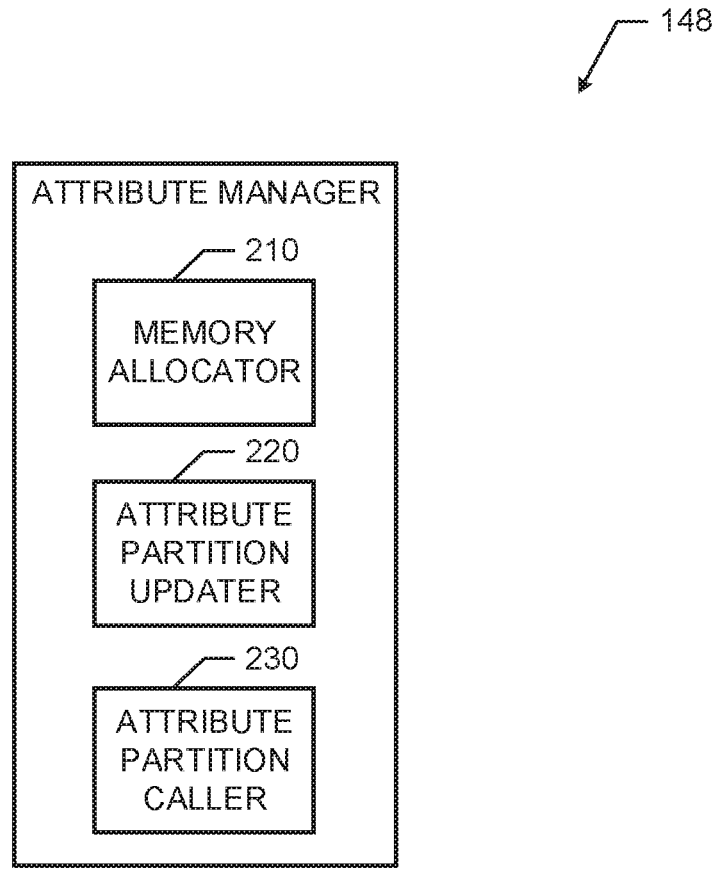
FIG. 2 is a block diagram of an example attribute manager that may be implemented in partitions of the example data processing system of FIG. 1.

FIG. 2 is a block diagram of an example attribute manager 148. The attribute manager 148 of FIG. 2 may be used to implement the attribute manager 148 of FIG. 1. The example attribute manager 148 of FIG. 2 includes a memory allocator 210, an attribute partition updater 220, and an attribute partition caller 230. The memory allocator 210 acquires shared memory regions to form an attribute partition 160 corresponding to the processing partition 140 of the attribute manager 148 of FIG. 2, and thus that attribute partition 160 joins the off-heap memory store 110. The example attribute partition updater 220 and attribute partition caller 230 may utilize the acquired off-heap memory regions that host attribute tables 162 of the off-heap memory store 110 as a cache mechanism (implemented by the attribute tables 162 of the attribute partitions 160).

In examples herein, the memory allocator 210 acquires shared memory regions of a shared memory for the processing partitions 140 to create the corresponding attribute partitions 160 to become part of the off-heap memory store 110. Accordingly, the memory allocator 210 may identify memory regions available in a shared-memory for creating attribute partitions 160. In some examples, the memory allocator 210 may perform a locality analysis of the available memory regions 110 and select memory regions from a shared memory having a closest proximity (e.g., a shortest physical distance, a shortest route distance, etc.) to the processing node where the respective processing partition 140 of the attribute manager 148 (see FIG. 3) is hosted.

The example attribute partition updater 220 of FIG. 2 updates the attribute tables 162 in the attribute partitions 160 (e.g., via write operations) after the processing iterator 144 performs a processing iteration. Accordingly, the attribute partition updater 220 may access the attribute partitions 160 owned by the corresponding processing partition 140. The attribute partition updater 220 may utilize the local routing table 146 to access attributes stored in the corresponding attribute partition 160. For example, the attribute updates may correspond to updates to the local data 142 (e.g., the attribute values associated with the $keys_i$) during processing iterations performed by the processor iterator 144 (see FIG. 4). In examples herein, the attribute partition updater 220 may perform an "in-place" update to the attribute partition tables 162. For example, the attribute partition updater 220 may overwrite previously recorded attributes in the attribute tables 162. Accordingly, the attribute manager 148 may consume fewer memory resources, rather than create new entries for each iteration (which may be performed in traditional object caching).

The example attribute partition caller 230 of FIG. 2 may perform calls (e.g., read accesses) to the attribute partitions 160 of FIG. 1. For example, the attribute partition caller 230 may identify attributes in the attribute tables 162 in the attribute partitions 160. The example attribute partition caller 230 may refer to the local routing table 146 and/or the global routing table 132 to identify routing information (e.g., see FIGS. 4 and 5) to the appropriate attribute partitions 160 in the off-heap memory store 110. Using the routing information from the local routing table 146 and/or the global routing table 132, the attribute partition caller 230 may identify the appropriate attribute and read/retrieve attributes from the attribute tables 162 of the appropriate attribute partition 160.

In examples herein, because the off-heap memory store 110 is constructed from a shared memory (e.g., a non-volatile memory, a dynamic random access memory (DRAM), etc.) of the data processing system 100, the attribute partition caller 230 of FIG. 2 may perform a read access on any of the attribute partitions 160. Thus, examples herein may enable fault tolerance, such that, if one of the processing partitions 140 crashes (e.g., the process iterator 144 encounters an error, fails, etc.), one of the other processing partitions 140 may read the attribute partition 160 corresponding to the crashed processing partition 140 and restore the crashed processing partition 140 to a proper iteration or previous state (rather than the crashed processing partition 140 restoring the state of the processing partition 140 by re-executing iterations from an initial iteration of the processing partition 140. Accordingly, a first processing partition may access attributes of a second processing partition and provide the attributes of the second processing partition to a previous state (e.g., in the event of a crash of the second processing partition).

While an example manner of implementing the attribute manager 148 of FIG. 1 is illustrated in FIG. 2, at least one of the elements, processes and/or devices illustrated in FIG. 2 may be combined, divided, re-arranged, omitted, eliminated and/or implemented in any other way. Further, the memory allocator 110, the attribute partition updater 220, the attribute partition caller 230, and/or, more generally, the example attribute manager 148 of FIG. 2 may be implemented by hardware and/or any combination of hardware and executable instructions (e.g., software and/or firmware). Thus, for example, any of the memory allocator 110, the attribute partition updater 220, the attribute partition caller 230, and/or, more generally, the example attribute manager 148 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the memory allocator 110, the attribute partition updater 220, and/or the attribute partition caller 230 is/are hereby expressly defined to include a tangible machine readable storage device or storage disk such as a memory, a digital versatile disk (DVD), a compact disk (CD), a Blu-ray disk, etc. storing the executable instructions. Further still, the example attribute manager 148 of FIG. 2 may include at least one element, process, and/or device in addition to, or instead of, those illustrated in FIG. 2, and/or may include more than one of any or all of the illustrated elements, processes and devices.

Figure 3:
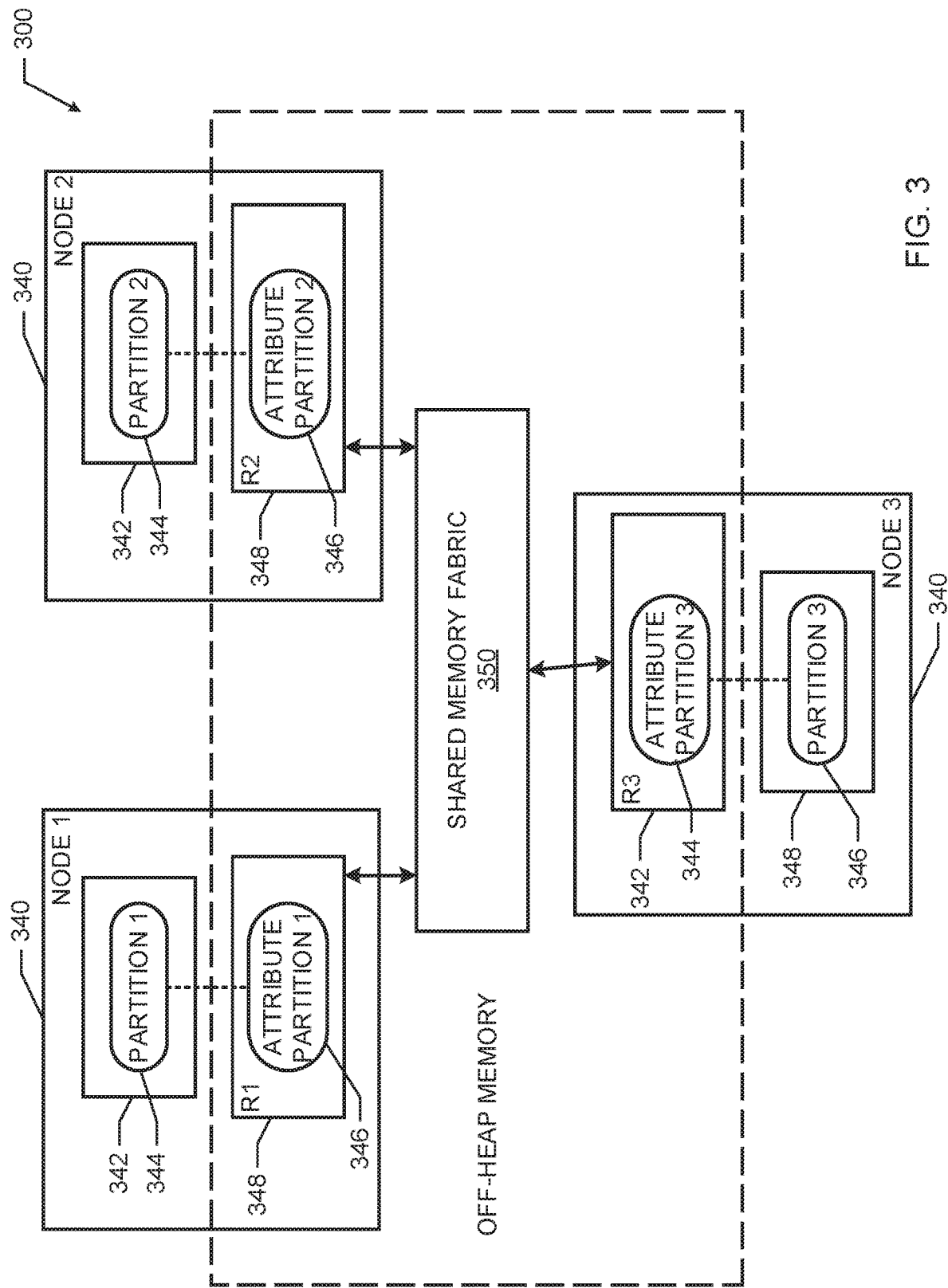
FIG. 3 is an example logical representation of the example data processing system of FIG. 1.

FIG. 3 is an example logical representation of an example data processing system 300 including an off-heap memory store 310 of FIG. 1. The example data processing system 300 may be implemented by the data processing system 100 of FIG. 1. In the illustrated example of FIG. 3, three nodes 340 (identified as NODE 1, NODE 2, NODE 3) have access to the off-heap memory store 310, which may be implemented by the off-heap memory store 110 of FIG. 1, The example processing nodes 340 include a process iterator 342, a processing partition 344 and an attribute partition 346 in shared memory regions 348 to construct the off-heap memory store 310 from a shared memory (e.g., a NVM or DRAM) of the nodes 340, The example nodes 340 may be implemented by three of the processing partitions 140 and three corresponding attribute partitions 160. In the illustrated example of FIG. 3, the processing nodes 340 may access attribute partitions 346 of each other via a shared memory interconnect 350 (e.g., a high-speed shared memory fabric).

As illustrated in FIG. 3, the attribute partitions 346 of the processing nodes 340 are located within the off-heap memory store 340, while the processing iterators 342 and processing partitions 344 may be located in non-shared memory locations of the data processing system 300.

In the illustrated example of FIG. 3, the physical layout of the data processing system 300, including the off-heap memory store 310, may be considered relatively accurate, such that the shared memory regions 348 of the nodes 340 are within close proximity to the corresponding processing partitions 344. For example, NODE 1 does uses shared memory region R1, rather than shared memory regions R2 or R3, as the shared memory region R1 is within close proximity to the process iterator 344. In examples herein, a memory allocator of NODE 1, such as the memory allocator 210 of FIG. 2, may identify available memory regions in the shared memory. Accordingly, the representation of the data processing system 300 illustrates a logical and potential physical layout of nodes that may be considered in examples herein.

Figure 4:
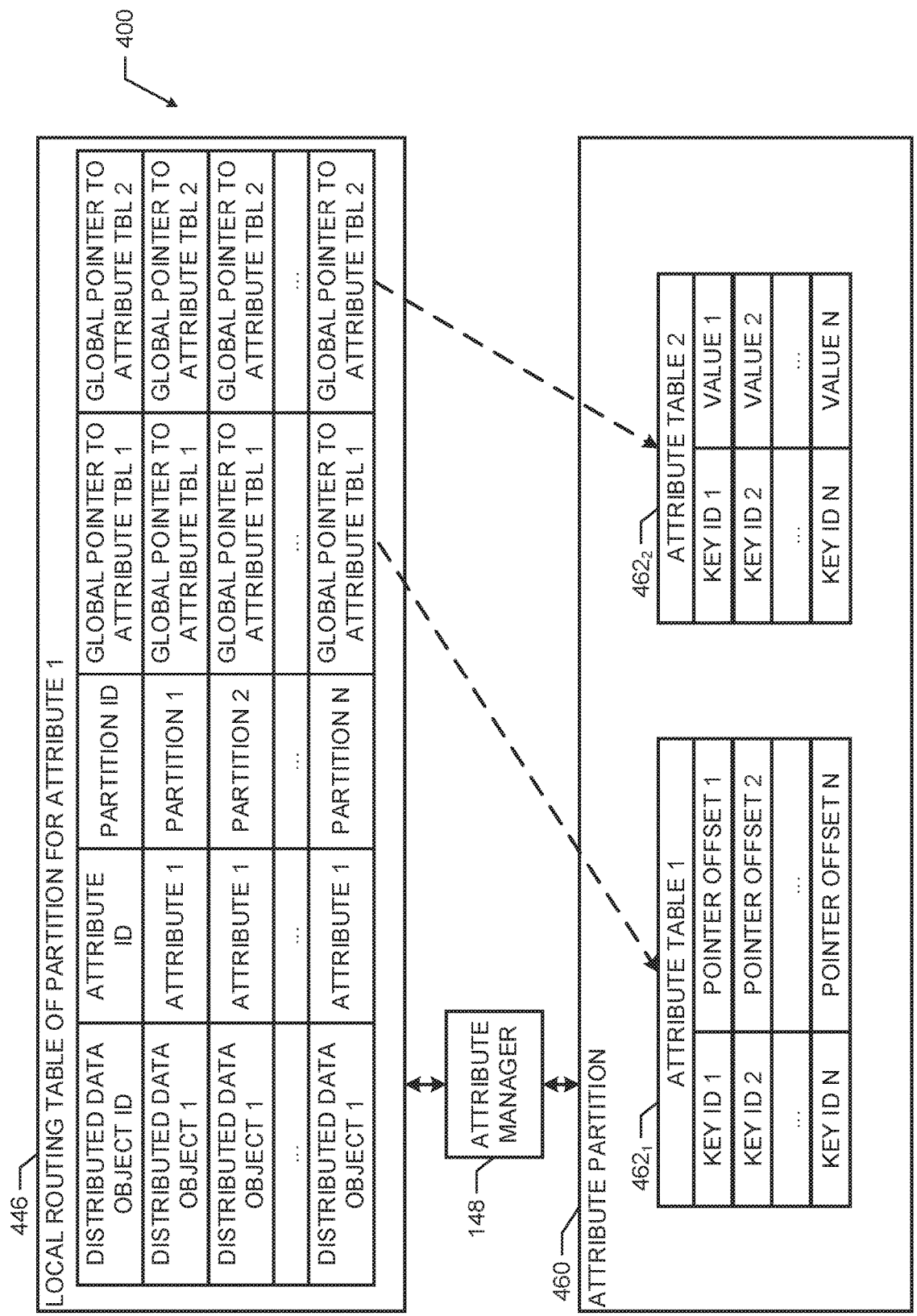
FIG. 4 is an example implementation and routing scheme that may be used by the attribute manager of FIG. 2 to route and retrieve attributes in the data processing system 100 of FIG. 1.

FIG. 4 illustrates an example implementation and routing scheme 400 that may be used by the attribute manager 148 of FIG. 1 (or FIG. 2) to route and retrieve attributes to/from the attribute tables 162 of the attribute partitions 160 of FIG. 1. In the illustrated example of FIG. 4, the attribute manager 148 routes attributes from a local routing table 446 (which may be implemented by the local routing table 146 of FIG. 1) to attribute tables $462_1$ and $462_2$.

In FIG. 4, the local routing table 446 includes columns for a distributed data object ID (distributed data object 1), an attribute ID (attribute 1), a partition ID (Partition 1), a global pointer to attribute table 1, and a global pointer to attribute table 2 in the attribute tables 162 of an attribute partition 160 corresponding to the processing partition 140 (and attribute manager 148) of the local routing table 446. In examples herein, the distributed data object ID of the local routing table 446 may be a unique identifier to represent a unique distributed data object (e.g., a graph) in the data processing system 100 of FIG. 1. The attribute ID of the local routing table 446 may be a unique identifier to differentiate the attributes (e.g., vertex of a graph) in the same distributed data object across the processing partitions 140 of the data processing system 100 of FIG. 1. The partition ID of the local routing table 446 is a unique identifier to differentiate the processing partitions 140 for the same distributed data object across the data processing system 100 of FIG. 1. The global pointer to attribute tables 1 and 2 are global pointers pointing to a shared memory region (e.g., the corresponding attribute partition 160 location) where the attribute tables 162 (e.g., attribute table 1 and attribute table 2) respectively begin.

As illustrated in FIG. 4, the global pointers point to the attribute tables $462_1$ and $462_2$. The example attribute tables $462_1$ and $462_2$ of FIG. 4 may be attribute sub-tables of one of the attribute tables 162 of one of the attribute partitions 160 corresponding to the appropriate processing partition 140 (and attribute manager 148). In FIG. 3, the first attribute table 462$_1$ (Attribute Table 1) may be a hash table that stores keys of the <key, value> pairs of the corresponding processing partition 140 and a pointer offset to the values in the second attribute table 462$_2$ (Attribute Table 2).

The second attribute table 462$_2$ (Attribute Table 2) may be a sorted array table with sorting order based on a type of keys. The keys of the second attribute table 462$_2$ are the same keys as <key, value> pairs in the corresponding local data 142 of the processing partition 140. Depending on the type of the data partition 140, the key may be a primitive type (e.g., integer, float, long, etc.) or a byte[ ] type, which as a maximum size of a byte array of the data processing system 100. The example values may be a primitive type (e.g., integer, float, long, etc.), an array type (e.g., an array of integers, floats, longs, etc. with a maximum size), or a byte[ ] type, which has the maximum size of the byte array and may be used to store an arbitrary object type in a serialized format.

In some examples, when the distributed data object in the processing partitions 140 of FIG. 1 is a graph, the first attribute table 462$_1$ (Attribute Table 1) and the second attribute table 462$_2$ (Attribute Table 2) may be a Vertex Attribute Table that maps vertex identifiers for vertices of a graph and the corresponding belief propagations of the vertices or an Edge Attribute Table that maps edge identifiers for edges of the graph to messages of the edges.

In examples herein, the attribute tables 462$_1$ and 462$_2$ may be accessed (e.g., via read accesses) of any of the attribute manager 148 for any of the processing partitions 140 of FIG. 1. In some examples, for a given key ID, the attribute manager 148 may refer to the first attribute table 462$_1$ (Attribute Table 1) and return the pointer offset. In some examples, for a relatively small set of key IDs (less than 100), the attribute manager 148 may refer to the first attribute table 462$_2$ via a bulk read and respond with a plurality of pointer offsets corresponding to the relatively small set of key IDs. For a large set of key IDs (over 100) in sorted order, the attribute manager 148 may perform a direct scan of the second attribute table 462$_2$ (Attribute Table 2) and filter out keys that are not in the specified relatively large collection, and record the pointer offset relative to the start of the second attribute table 462$_2$ (Attribute Table 2).

In examples herein, the attribute manager 148 (e.g., via the attribute partition updater 220) may create the attribute tables 462$_1$ and 462$_2$ in accordance with the following examples. To create the attribute tables 462$_1$ and 462$_2$, the attribute manager 148 may create a temporary hash table and temporary vector in local DRAM of the corresponding processing partition. From the process iterator 144, the attribute manager 148 scans through the keys of the processing partition 140 one by one and inserts the keys into the temporary vector. The attribute manager 148 may then sort the keys (e.g., in ascending order, descending order, etc.). With the sorted keys (also the total number of keys in the vector), the second attribute table 462$_2$ (Attribute Table 2) may be created in the off-heap memory store 110 for an attribute partition 160 (which may have been set up from allocated memory 210) and populated with the keys and zeroed-values. The attribute manager 148 may then populate the temporary hash table with the same keys, and the values being the pointer offset that is associated with the corresponding values in the second attribute table 462$_2$ (Attribute Table 2).

Once the attribute manager 148 fully populates the temporary hash table in the DRAM, a two-array based data structure may be used to layout the first attribute table 462$_1$ (Attribute Table 1). Additionally, the attribute manager 148 may update the global pointers to the attribute tables 462$_1$ and 462$_2$ in the local routing table 446 when both the attribute tables 462$_1$ and 462$_2$ are created in the same shared memory region (e.g., the same attribute partition 160). Since both attribute tables 462$_1$ and 462$_2$ are in the same shared memory region, the pointer offsets of the first attribute table 462$_1$ (Attribute Table 1) are valid.

Once the attribute tables are created the attribute manager 148 may then write/update the attributes based on processed iterations of the processing partitions 140. In some examples, for a single key ID or relatively small collection of keys (e.g., less than 100), the attribute manager 148 may write or update attributes by using the key ID to find the pointer offset from the first attribute table 462$_1$ (Attribute Table 1), and from the actual pointer computed from the pointer offset, write/update the value stored in the second attribute table 462$_2$ (Attribute Table 2). In examples for a relatively large collection of keys (e.g., more than 100), the attribute manager 148 may directly scan the second attribute table 462$_2$ (Attribute Table 2), filter out keys that are not included in the relatively large collection, and directly update the corresponding values only for the keys in the specified relatively large collection. Accordingly, the attribute manager 148 may perform in-place updates of attributes using the attribute tables 462$_1$ and 462$_2$ (or the attribute tables 162 of FIG. 1).

Figure 5:
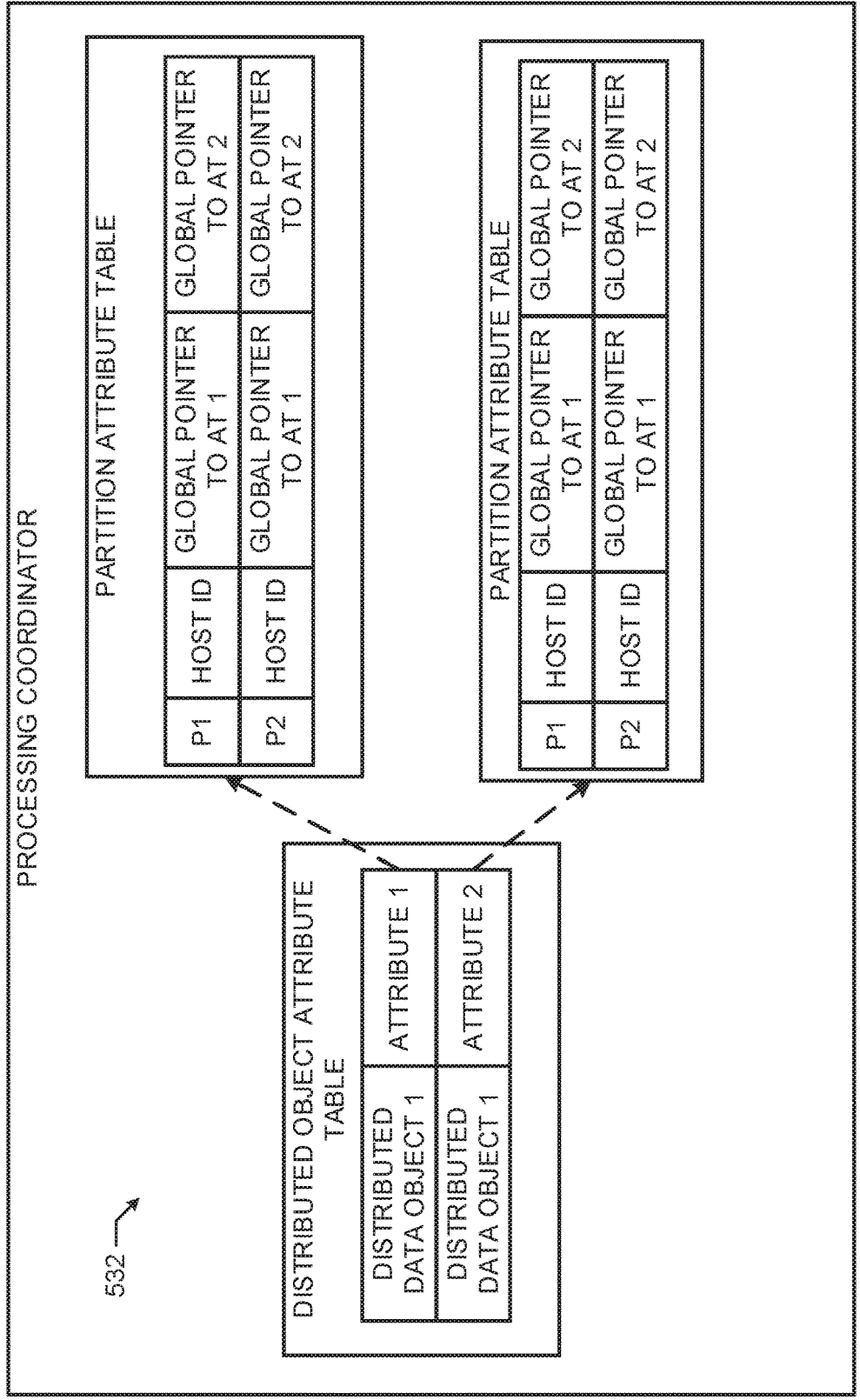
FIG. 5 is an example implementation and routing scheme that may be implemented by a processing coordinator of the data processing system of FIG. 1.

FIG. 5 illustrates an example implementation and routing scheme 500 (which may implement the global routing table 132 of FIG. 1) that is implemented by a processing coordinator 530 (which may be used to implement the processing coordinator 130). The example implementation and routing scheme 500 may be used by the attribute manager 148 of FIG. 1 to route and retrieve attributes to/from the attribute tables 162 of the attribute partitions 160 of FIG. 1. In examples herein, the processing coordinator 530 receives local routing table information (e.g., corresponding to the local routing tables 146 of the processing partitions 140 of FIG. 1). The example processing coordinator 530 may assemble the local routing tables 146 to create a global routing table 532.

The global routing table 532 of FIG. 5 includes two tables, a distributed object attribute table 360 and partition attribute tables for each attribute of the data processing system 100 (which is why two partition attributes are included in the example of FIG. 5, one for each attribute of the distributed object attribute table). The distributed object attribute table includes distributed object identifiers identifying the object of the attributes, and attributes of the objects, as well as links (denoted by the dotted lines) to the appropriate attribute partition tables. The example attribute partition tables include a partition id (which identifies one of the processing partitions 140 includes the attribute), a host ID (which identifies a host or process identifier where the partition table is located), and global pointers to the attribute tables 162 of the corresponding attribute partitions 160. The example processing coordinator 530 (which may be used to implement the processing coordinator 130 of FIG. 1) may broadcast the global routing to table to the processing partitions that perform the distributed data processing, such that each processing partition can have a local copy of the global routing table. With the global routing table, a task execution performed in any of the processing partitions 140 can access other partition's attribute tables 162 via the attribute partitions in the off-heap memory store 110.

Figure 6:
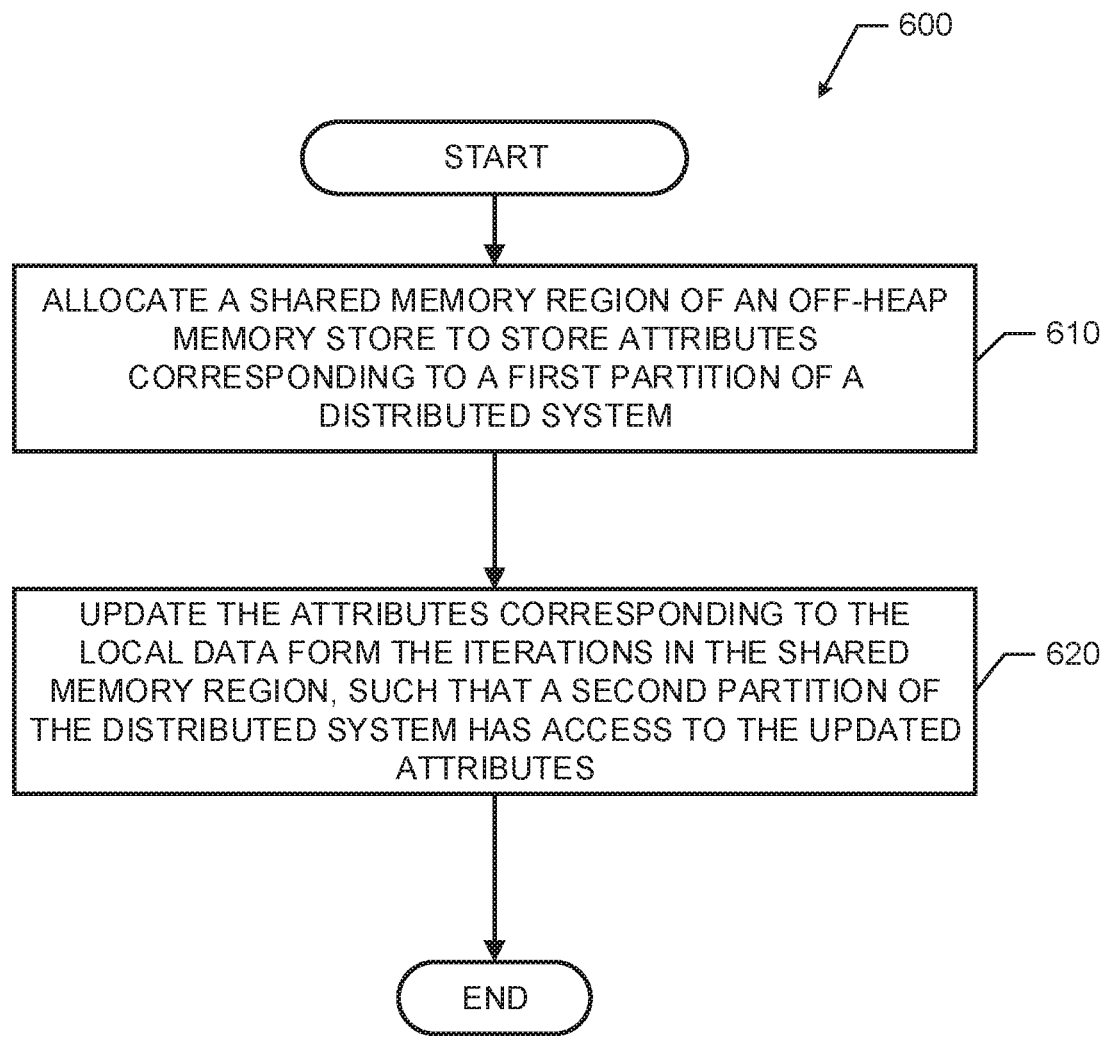
FIG. 6 is a flowchart representative of example machine readable instructions that may be executed to implement the attribute manager of FIG. 2.
Figure 7:
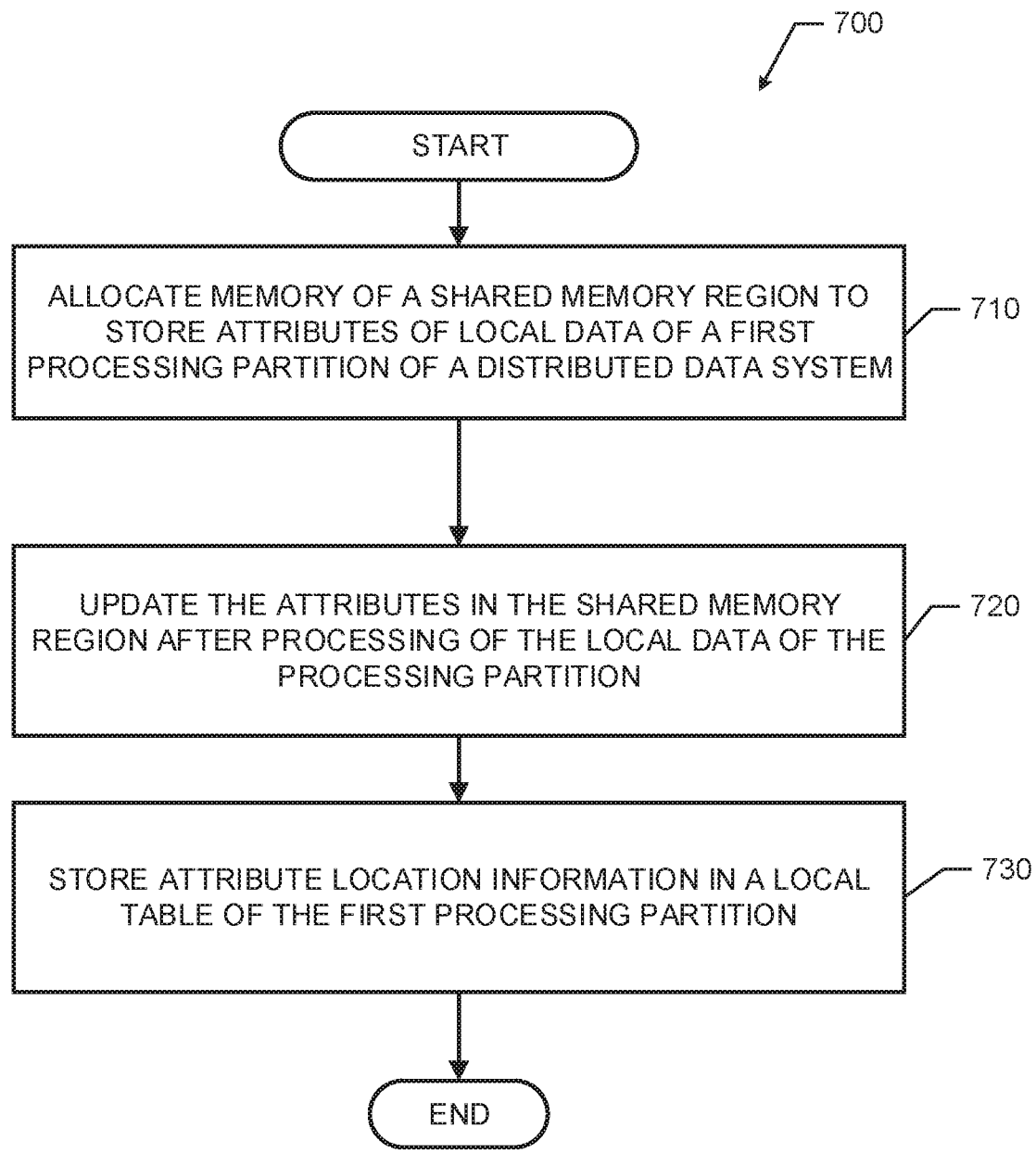
FIG. 7 is another flowchart representative of example machine readable instructions that may be executed to implement the attribute manager of FIG. 2.

Flowcharts representative of example machine readable instructions for implementing the attribute manager 148 of FIG. 2 is shown in FIGS. 6 and 7. In this example, the machine readable instructions comprise a program/process for execution by a processor such as the processor 812 shown in the example processor platform 800 discussed below in connection with FIG. 8. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 812, but the entire program/process and/or parts thereof could alternatively be executed by a device other than the processor 812 and/or embodied in firmware or dedicated hardware. Further, although the example program(s)/process(es) is/are described with reference to the flowcharts illustrated in FIGS. 6 and 7, many other methods of implementing the example attribute manager 148 may alternatively be used. For example, the order of execution of the blocks may be changed, and/or some of the blocks described may be changed, eliminated, or combined.

The example process 600 of FIG. 6 begins with an initiation of the attribute manager 148 (e.g., upon startup, upon instructions from a user, upon startup of a device implementing the code enabled media generator 110 (e.g., the processing partition 140, the data processing engine 120), etc.). The example process 600 of FIG. 6 may be executed to enable access to updated attributes of data partitions to all partitions of a distributed data system. At block 610, the memory allocator 210 allocates memory from the shared memory to store attributes corresponding to a first partition of a data system.

At block 620 of FIG. 6, the attribute manager attribute partition updater 230 updates the attributes corresponding to the local data from process iterations of the first partition, such that a second partition of the distributed data system has access to the updated attributes. After block 620, the example process ends. After execution of the example process 600, any of the data partitions of the distributed data system may have access to the updated attributes in the shared memory regions.

The example process 700 of FIG. 7 begins with an initiation of the attribute manager 148 of FIG. 2. At block 710 of FIG. 7, the memory allocator 210 allocates memory from a shared memory region to store attributes of local data of a first processing partition 140 of the distributed data system 100. At block 720, the attribute partition updater 220 updates the attributes in the shared memory region after processing of the local data of the processing partition.

At block 730 in the example process 700 of FIG. 7, the attribute manager 148 stores attribute location information in the local routing table 146 of the first processing iteration 140. For example, the attribute manager 148 may create an entry for any attribute of the local data and a global pointer to the location of the attribute in the off-heap memory store. After block 730, the example process ends. In some examples, after block 730, after the local routing tables 146 is formed, the processing partitions 140 may send the local routing tables 146 (e.g., using a pointer to the local routing tables 146) to the processing coordinator 130, which updates the global routing table 132 with the information from the local routing tables 146.

As mentioned above, the example processes of FIGS. 6 and/or 7 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 6 and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 8:
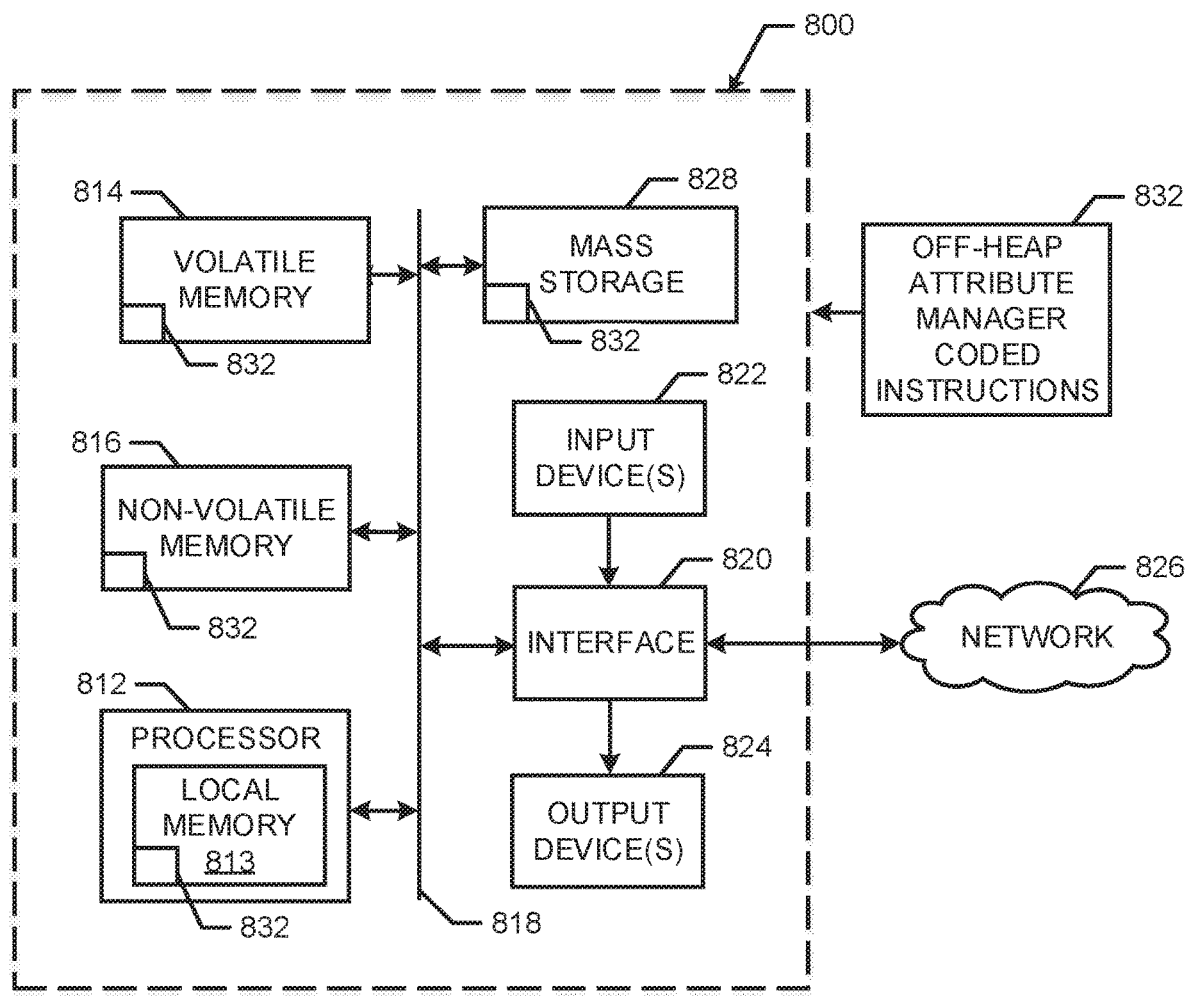
FIG. 8 is a block diagram of an example processor platform capable of executing the instructions of FIGS. 6 and/or 7 to implement the attribute manager of FIG. 2.

FIG. 8 is a block diagram of an example processor platform 800 capable of executing the instructions of FIGS. 6 and 7 to implement the attribute manager 148 of FIG. 2. The example processor platform 800 may be or may be included in any type of apparatus, such as a server, a personal computer, any other type of computing device.

The processor platform 800 of the illustrated example of FIG. 8 includes a processor 812. The processor 812 of the illustrated example is hardware. For example, the processor 812 can be implemented by at least one integrated circuit, logic circuit, microprocessor or controller from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, at least one input device 822 is connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 824 is also connected to the interface circuit 820 of the illustrated example. The output device(s) 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, may include a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes at least one mass storage device 828 for storing executable instructions (e.g., software) and/or data. Examples of such mass storage device(s) 828 include floppy disk drives, hard drive disks, compact disk drives, Blu-ray disk drives, RAID systems, and digital versatile disk (DVD) drives.

The coded instructions 832 of FIGS. 6 and 7 may be stored in the mass storage device 828, in the local memory 813 in the volatile memory 814, in the non-volatile memory 816, and/or on a removable tangible machine readable storage medium such as a CD or DVD.

From the foregoing, it will be appreciated that the above disclosed methods, apparatus and articles of manufacture provide an off-heap memory store of a distributed data processing system to facilitate sharing of attributes between data partitions of the distributed data processing system. In examples herein, the off-heap memory store may be implemented as an efficient, high speed cache system that enables quick access (e.g., read and write) to updated attributes in the off-heap memory store. Examples herein allow for in-place updating of the attributes in the off-heap memory store for efficient memory consumption. A system of tables and pointers enable direct memory access to the off-heap memory without the need to send data from one memory store location to another. Locality of available shared memory regions may be considered to increase access speeds when allocating portions of the off-heap memory store to data partitions of the distributed data system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
allocating a shared memory region of a shared memory to store attributes corresponding to a first processing partition of a distributed data system, the first processing partition comprising first local data corresponding to a distributed object across a plurality of processing partitions of the distributed data system; and
updating, in the shared memory region, the attributes corresponding to updates to the local data from process iterations of the first processing partition, such that a second processing partition of the distributed data system has access to the updated attributes, the second processing partition comprising second local data for the distributed data object, wherein the attributes are updated in-place in the shared memory region by overwriting a previous attribute from a previous iteration.

2. The method of claim 1, further comprising:
creating attribute tables in the shared memory region of the shared memory, the attribute tables to store the attributes of the local data.

3. The method of claim 2, wherein the attribute tables include a hash table and a sorted array, wherein the hash table maps keys of key/value pairs of the local data to a pointer offset of the shared memory region, the pointer offset pointing to keys of the sorted array and corresponding values of the keys.

4. The method of claim 1, further comprising:
instructing the second processing partition to retrieve the attributes of the first processing partition after the first processing partition fails, wherein the second processing partition restores the first processing partition to a previous state using the attributes.

5. The method of claim 1, further comprising:
identifying available memory space in the shared memory; and
selecting the shared memory region based on the proximity of the shared memory region to the first processing partition.

6. A system comprising:
a shared memory; and
a plurality of processing partitions of a distributed data system, the plurality of processing partitions storing local data corresponding to a distributed object and having access to the shared memory, the plurality of processing partition comprising attribute managers to:
allocate the shared memory regions of the shared memory to form an off-heap memory store that is accessible by the plurality of processing partitions;
store attributes corresponding to the local data of the plurality of processing partitions in the shared memory regions of the shared memory, such that each of the plurality of processing partitions has direct memory access to the attributes.

7. The system of claim 6, further comprising:
a processing coordinator to distribute attribute information via a global routing table, the global routing table comprising local routing table data from the plurality of processing partitions, the local routing table data storing pointers to the attributes in the off-heap memory store.

8. The system of claim 7, wherein the processing partitions are further to update the local routing table data after each processing iteration of the local data.

9. A method comprising:
allocating shared memory regions of a shared memory to form an off-heap memory store that is accessible by a plurality of processing partitions of a distributed data system, wherein the plurality of processing partitions store local data corresponding to a distributed object and have access to the shared memory; and
storing attributes corresponding to the local data of the plurality of processing partitions in the shared memory regions of the shared memory, such that each of the plurality of processing partitions has direct memory access to the attributes.

10. The method of claim 9, further comprising:
distributing attribute information via a global routing table, the global routing table comprising local routing table data from the plurality of processing partitions, the local routing table data storing pointers to the attributes in the off-heap memory store.

11. The method of claim 10, further comprising:
updating the local routing table data after each processing iteration of the local data.

\* \* \* \* \*